US006443297B1

(12) United States Patent
Johnston (10) Patent No.: US 6,443,297 B1
(45) Date of Patent: Sep. 3, 2002

(54) PULLEY LAGGING WITH HOOK AND LOOP FASTENER ATTACHMENT SYSTEM

(75) Inventor: Jeff Johnston, Springfield, NJ (US)

(73) Assignee: Belting Industries Co., Inc., Kenilworth, NJ (US)

(*) Notice: Subject to any disclaimer, the term of this patent is extended or adjusted under 35 U.S.C. 154(b) by 115 days.

(21) Appl. No.: 09/635,327

(22) Filed: Aug. 9, 2000

(51) Int. Cl.$^7$ ............................................ B65G 23/04
(52) U.S. Cl. .................. 198/835; 198/690.2; 198/843; 193/37
(58) Field of Search .................. 198/835, 843, 198/688.1, 690.2; 193/37

(56) References Cited

U.S. PATENT DOCUMENTS

| | | | |
|---|---|---|---|
| 2,941,410 A | | 6/1960 | Ota |
| 3,143,895 A | | 8/1964 | Robie |
| 4,028,949 A | | 6/1977 | Hagen |
| 4,140,014 A | | 2/1979 | Gradomi et al. |
| 4,143,759 A | * | 3/1979 | Paradis ................ 198/690.2 |
| 4,284,409 A | | 8/1981 | Teslaar |
| 4,290,761 A | * | 9/1981 | Suginaka ............. 198/835 X |
| D280,772 S | | 9/1985 | McCreery et al. |
| 4,718,544 A | | 1/1988 | Herren |
| 4,832,183 A | * | 5/1989 | Lapeyre .............. 198/690.2 X |
| 5,119,924 A | * | 6/1992 | Kaminski ............. 198/835 X |
| 5,190,146 A | | 3/1993 | Valster et al. |
| 5,209,704 A | | 5/1993 | Valster et al. |
| 5,630,500 A | * | 5/1997 | Conrad ............... 198/835 X |
| D381,174 S | | 7/1997 | Stoll |
| D381,175 S | | 7/1997 | Stoll |
| 6,068,100 A | * | 5/2000 | Thomas ............... 193/37 |

FOREIGN PATENT DOCUMENTS

| | | | |
|---|---|---|---|
| DE | 3029158 A1 | 2/1982 | |
| DE | 3224593 | * 1/1983 | ............. 198/843 |
| RU | 163946 | 12/1964 | |

* cited by examiner

Primary Examiner—James R. Bidwell
(74) Attorney, Agent, or Firm—McGlew and Tuttle, P.C.

(57) ABSTRACT

A pulley with pulley lagging, a pulley, pulley lagging and belt system and method are provided. The pulley has an outer surface with a length and a circumference. A hook and loop fastener strip is provided having one of a loop or a hook surface section and a back surface. The hook and loop fastener strip has a first tapered end with a first cutline edge and a second tapered end with a second cutline edge. The hook and loop fastener strip back surface is bonded to the pulley element outer surface with the strip spiral wrapped with the first cutline edge having a length substantially equal to the circumference and positioned substantially at an edge of the pulley element and with the second cutline edge having a length substantially equal to the circumference and positioned substantially at another edge of said pulley element. A composite strip is provided including another hook and loop fastener strip having the other of a loop or a hook surface section and a back surface and a lagging strip with a belt engagement surface and a back surface. The another hook and loop fastener strip back is bonded to the lagging strip back. The composite strip has a first tapered end with a first cutline edge and a second tapered end with a second cutline edge. The composite strip with the other of a loop or a hook surface is connected to the loop or a hook surface section strip to provide a pulley and lagging assembly with the belt engagement surface facing outwardly.

20 Claims, 7 Drawing Sheets

PULLEY LAGGING WITH HOOK AND LOOP FASTENER ATTACHMENT SYSTEM

FIELD OF THE INVENTION

The invention relates generally to pulley and belt systems, particularly such as systems used for transporting packages and other items for delivery and storage.

BACKGROUND OF THE INVENTION

Pulley and belt systems are used extensively in the package delivery and storage industries. Pulley and belt systems are also used in manufacturing and goods delivery services. Maintaining these systems involves extensive work with regard to belt maintenance. The interface between the pulley lagging and the surface of the belt, which contacts the pulley lagging must particularly be maintained. The lagging element must be replaced from time to time, and the belt must also occasionally be replaced.

U.S. Pat. No. D280,772 discloses a replaceable pulley lagging pad. The pad is connected to the pulley with metal clips engaging side flanges which are connected to pulley lagging strips. Several strips are provided affixed to the pulley. Another prior art design from U.S. Pat. No. D381,174 uses pulley lagging blocks which are connected to the pulley. A similar design is presented in U.S. Pat. No. D381,175. U.S. Pat. No. 4,284,409 (Van Teslaar) discloses a replaceable pulley lagging for an initially smooth-faced, endless conveyor or elevator belt drive pulley. Rubber pads are secured to the face of the pulley in detachable fashion with set screws to permit removal and replacement of the pads when worn or damaged. Connectable and disconnectable pulley lagging elements, in the form of strips, is also disclosed in U.S. Pat. No. 4,718,544. Replaceable pulley strips are disclosed in U.S. Pat. No. 5,190, 146, wherein a special pulley is provided (see also U.S. Pat. No. 5,209,704).

U.S. Pat. No. 4,140,014 (Gradoni et al.) shows lagged drive wheels for continuous conveyor belts that are lagged with a textile fabric of woven polyester yarn and a friction surface of polyester textile fibers needled to the base. In addition, the patent to Robie (U.S. Pat. No. 3,143,895) describes a device for transmitting motion using hook and pile fabrics on the surfaces of belts, pulleys and slabs. Other prior art references discloses enhanced friction surfaces for the pulley lagging belt interface. For example, U.S. Pat. No. 2,941,410 discloses a power transmission mechanism with special pile zones at the belt lagging interface. The a movable part interconnection system disclosed in U.S. Pat. No. 4,028,949 uses bristles to improve the frictional connection. SU163946 discloses a belt drive system with a hook and loop fastener interface for good connection between the belt and the pulley. DE 30 29 158 discloses pulley elements with connection elements connecting pulley lagging to the pulley.

SUMMARY AND OBJECTS OF THE INVENTION

It is an object of the invention to provide a pulley and pulley lagging which allows for a good connection between the pulley and pulley lagging and allows for a simple and efficient replacement of the lagging.

According to the invention, a pulley with pulley lagging, a pulley, pulley lagging and belt to system and method are provided based on a pulley element having an outer surface with a length and a circumference. A hook and loop fastener strip is provided having one of a loop or a hook surface section and a back surface. The hook and loop fastener strip has a first tapered end with a first cutline edge and a second tapered end with a second cutline edge. The hook and loop fastener strip back surface is bonded to the pulley element outer surface with the strip spiral wrapped with the first cutline edge having a length substantially equal to the circumference and positioned substantially at an edge of the pulley element and with the second cutline edge having a length substantially equal to the circumference and positioned substantially at another edge of said pulley element. A composite strip is provided including another hook and loop fastener strip having the other of a loop or a hook surface section and a back surface and a lagging strip with a belt engagement surface and a back surface. The another hook and loop fastener strip back is bonded to the lagging strip back. The composite strip has a first tapered end with a first cutline edge and a second tapered end with a second cutline edge. The composite strip with the other of a loop or a hook surface is connected to the loop or a hook surface section strip to provide a pulley and lagging assembly with the belt engagement surface facing outwardly.

According to another aspect of the invention, the system is provided including a hook fastener strip, a loop fastener strip and a lagging strip. Each of the strips is cut to have two tapered ends. Each tapered ends has an angled cutline edge which defines, with the side edge of the strip, a tapering length leading to a vanishing point tip. The hook strip is bonded to the lagging strip such that a hook face of the hook strip faces in one direction and the lagging friction surface (for belt engagement) faces in the opposite direction. Preferably, the hook strip is bonded to the lagging strip prior to cutting the tapered ends. The cutline edge of the tapered ends is based on the circumference of the pulley to be used. Based on the known circumference of the pulley the cutline edge has a length equal to the circumference. The cutline edge defines an angle of the tapered section (tapered end), namely the angle of the cutline edge relative to the side edge, based on a given strip width. Additionally, the distance between the two taper termination (the end of the tapered section) points of the tapered ends of each strip is a length substantially defined by the pulley length. The tapered ends are cut, spaced a distance, corresponding to the length of the particular pulley used. After the strips are cut, the hook section strip is bonded to the pulley. The bond is applied to the pulley or the back face of the loop strip and the loop strip wrapped starting from one of the vanishing point tips with the cutline edge wrapping substantially along one edge of the pulley. The remaining length of strip continues to be wrapped around the pulley until the opposite vanishing point tip is bonded to the pulley with the opposite cutline edge wrapping substantially along the opposite edge of the pulley. This provides a spiral wrap or barber pole wrap. This is preferably a permanent bonded wrap with a permanent cement bond between the steel, aluminum or plastic pulley and the side of the loop section strip which is opposite the loop section. Set screws or other fasteners may be used to fix the vanishing point tip to the pulley at each pulley edge. The composite strip, namely the hook section strip bonded to the lagging section strip, has substantially the identical shape to the shape of the loop section strip applied to the pulley. The hook section strip is connected to the loop section and the composite strip is wrapped around the pulley. The connection is made such that the center of the composite strip covers the adjoining edges of the loop section strip, providing a staggering and resulting structural benefits.

The cutline may be made with a process that includes providing a length or role of loop section strip, providing a length or role of composite strip, measuring the necessary lengths for the particular pulley and cutting the cutline, at the proper position and at the proper angle for the particular pulley. The process includes cutting the cutline for each of the loop section strip and the composite strip at a factory or packaging facility and providing precut lengths for predetermined pulley sizes. The strips are then sold in a basic kit including preferably screws for vanishing point tips and bonding cement for fixing the loop section strip to the pulley. Replacement composite strips or composite strips with particular lagging frictional surfaces are sold in replacement packs or replacement kits. The basic kit may also be provided with a role of loop section strip and a role of composite strip. The cutline may be measured at the site of the use or just prior to use. The kit may also include a template facilitating the cutting of the cutline. The template may include an angled section for making the cut and may also include two angle sections with a premeasured length for forming each cutline of each cut strip for a given pulley size. Several templates may be provided, each for a different pulley size. A group of templates can be provided in the basic kit or a variety of templates can be sold in template package. As an alternative, instead of the use of templates for measuring and facilitating the cutting of the cutlines, each role of strip may have one or more rows of perforations to facilitate the cutting of the cutline for a particular pulley size. With the use of templates, a single kit may be used to set up several different pulleys or may be used to cut replacement composite strips for various different pulleys as the necessary strip lengths and cutlines may be adapted to any pulley dimension.

The invention provides significant advantages including a structurally stable pulley lagging/pulley connection and the ability to replace worn lagging elements quickly or quickly change pulley lagging for particular applications. The aspect of the invention including a pulley having a particular strip section applied to the surface thereof with a hook or loop fastener portion at the outer side of the strip (e.g. a loop section) provides an excellent basic unit which may be used over and over again with various different lagging elements. This pulley in combination with a lagging element formed of the composite strip is a structural combination which has significant advantages. A process based on this combination and system based on this combination significantly improve maintenance and use of pulley systems.

According to another feature of the invention, a pulley system is provided in which the belt has an outer conveying surface which includes a hook and loop fastener section (one of a hook section for a loop section). This Velcro type outer conveying surface is used advantageously with cooperating hook and loop fastener sections applied to items which are being conveyed. This belt system provides significant advantages as to positioning of items on the belt conveyer for further manufacturing steps or other steps, such as identification (e.g. bar code scanning, transponder detection etc.).

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings in particular, the invention comprises a pulley 10 and pulley lagging 50 as well as a system including the pulley 10, the pulley lagging 50 and also optionally including a particular belt 120. The process includes providing the particular components, including providing a kit with material for attaching and deattaching the lagging from an existing pulley 10.

Figure 1:
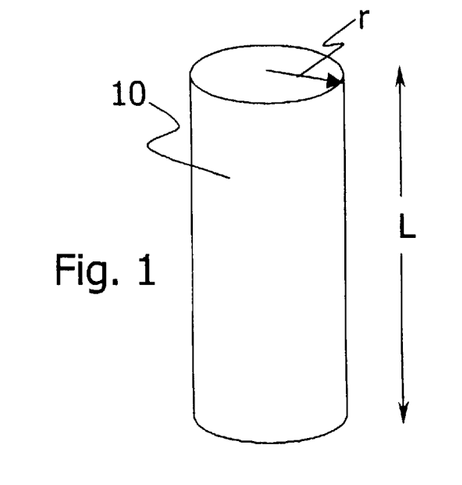
FIG. 1 is a perspective view of a pulley used according to the invention.

FIG. 1 shows a pulley 10 having a radius r and a length L. The circumference C=2πr. The outer surface of the pulley 10 can be determined based on the circumference C and the length L. Pulleys such as pulley 10 are used extensively in transportation and delivery services as well as in manufacturing applications. The pulley 10 is used in cooperation with a belt such as belt 120. The pulley 10 may be made of aluminum, steel, plastic or of a metal alloy. Typically the pulley 10 is provided with pulley lagging, to provide a good friction surface for the interface between the pulley and the belt. The invention provides a system for attaching pulley lagging and subsequently allowing quick and easy replacement of pulley lagging.

Figure 2:
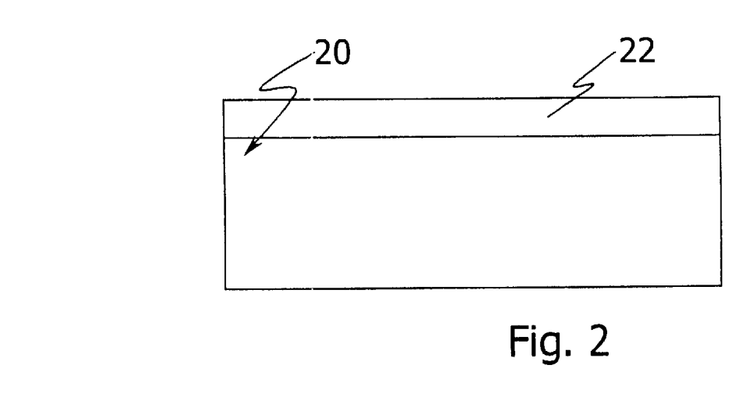
FIG. 2 is a top view of a pulley lagging sheet showing a strip section to be cut therefrom.

FIG. 2 shows a pulley lagging sheet element generally designated 20. Such pulley lagging elements or pulley covers include various surfaces having various different properties including frictional properties for the pulley lagging belt interface. Examples include Rough Top, Linatex™ and Light Impression, among others. According to a preferred embodiment of the invention the pulley lagging sheet 20 is cut into strips 22. The preferred embodiment of the invention provides the strips 22 with a two inch width. However, other widths may be used. The strip may be provided in a roll for convenience.

Figure 3:
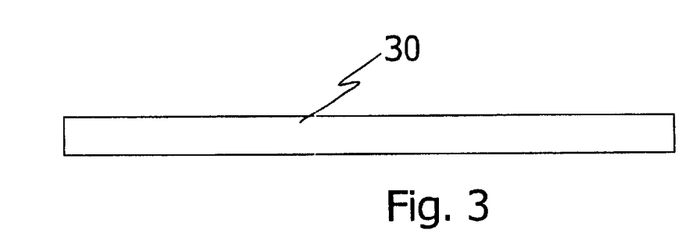
FIG. 3 is a top view of a loop section strip.

FIG. 3 shows a loop section strip element 30. The loop section strip element 30 has a back side and a velcro™ type loop section on a front side. The strip section 30 may be produced in strip form or may be cut from a large loop section sheet. The strip section 30 has a width of two inches according to a preferred embodiment of the invention. The strip may be extremely long and may be stored on a roll or similar structure. The relative dimensions of FIG. 3 do not necessarily correspond to the dimensions of the preferred strip 30 (the dimensions are used for illustrative purposes only).

Figure 4:
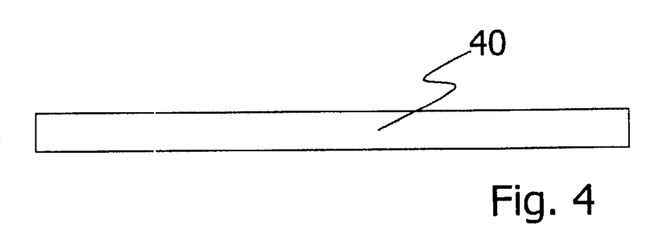
FIG. 4 is a top view of a hook section strip.

FIG. 4 shows a hook section strip 40. This has a back side as well as a front side with a hook section. The strip has a width of two inches according to a preferred embodiment of the invention. The strip may be cut from a larger hook section sheet. The strip may be provided as a very long strip, such as provided on a roll or the like.

Figure 5:
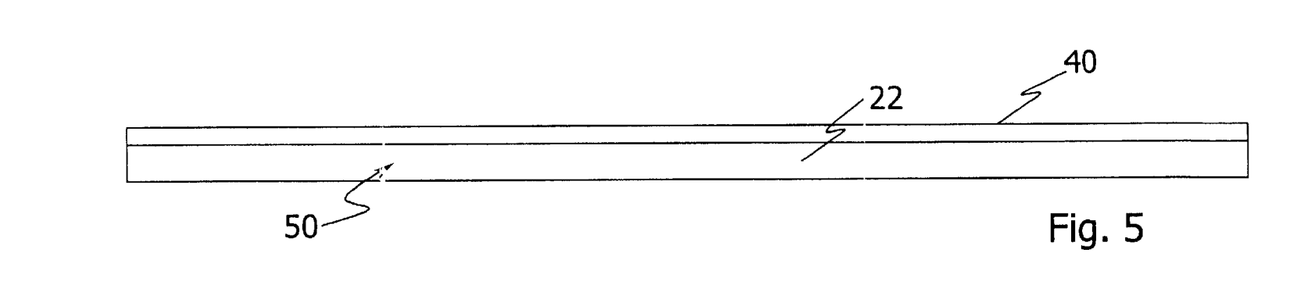
FIG. 5 is an dimensionally exaggerated side view of a composite hook section and lagging strip.

The invention provides a composite strip 50. The strip 50 is formed with the backside of the hook section strip 40 bonded to the backside of the lagging section strip 22. Preferably BI cement is used to make a very strong bond. Other useful commercially available bonding cements may be used. This provides a composite strip 50 as shown in FIG. 5. The lower side of the strip in FIG. 5 has the frictional surface or other preferred surface for the pulley belt engagement. The top side as viewed in FIG. 5 has the hook section for engagement with a cooperating loop section of a hook and loop fastener.

Figure 10A:
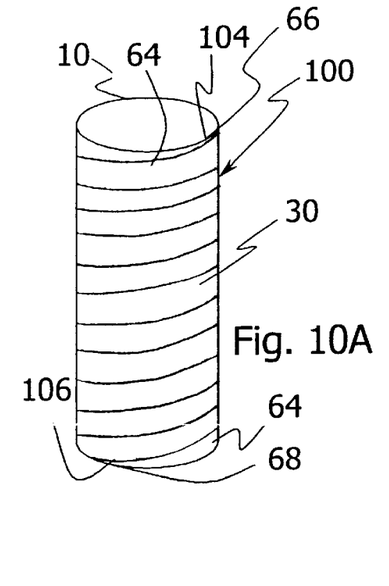
FIG. 10A is a perspective view showing a pulley with the loop section strip bonded thereto.
Figure 10B:
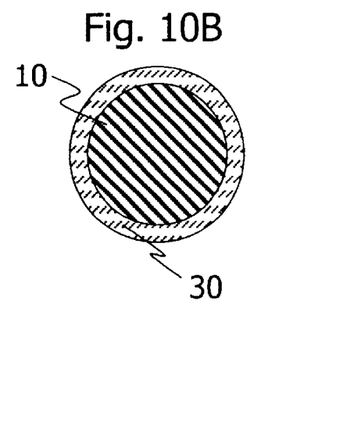
FIG. 10B is a cross sectional view of the pulley with the loop section strip bonded thereto.

The loop element 30 is bonded to the pulley 10 with the strip 30 spiral wrapped around the outer surface of the pulley 10 as shown in FIGS. 10A and 10B. To provide this, the strip 30 is first cut to provide cutlines 70 at each of the two ends of the strip. A length of strip 30 is paid off the roll. The cutlines 70 and 72 are provided at specific locations to form a tapered end strip 60 with tapered ends 62 and 64 and the vanishing point tip 66 at one end and the vanishing point tip 68 at the other end. The specific locations for the cut lines 70 and 72 are determined based on the circumference C of the pulley 10 and based on the length L of the cylinder 10. The angle θ is determined based on the known width W of the tapered end strip 60 and based on the cut line 70, 72 having a length which is substantially equal to the circumference (2πr) of the pulley 10. With this information, the tapered length T is determined as well as the angle θ. Further, with the length L and the known width W, the distance between the two tapered ends may be determined. This is based on the edges of the strip material 30 (in the form of a tapered end strip 60) substantially abutting as it wraps around the pulley 10. The distance from the vanishing point tip 66 at one end and the vanishing point tip 68 at the other end may be set (with some dimensional tolerance) for the particular pulley 10 (such as any pulley in active use). Based on this information, the length of strip 30 paid off of a roll is cut at cutlines 70 and 72 to provide tapered end strip 60 with two tapered ends. Of course other tapered strips 60 may be formed using the same roll of strip material 30.

In a similar manner cutlines 70 and 72 are provided to form a tapered strip 60 with the composite strip material 50. The location of the cutlines 70 and 72 is again determined based on the circumference C of the pulley 10 and the length L. The angle θ and the taper length T are substantially the same for the two end taper strip 60 made of composite material 50 and for the two tapered end strips 60 made of the strip material 30. In actual practice, the composite strip 50 is cut to be slightly longer than the strip 30 such that composite strip 50 may be wrapped around strip 30, which is wrapped around the outside surface of pulley 10 (see FIG. 11B).

Figure 7:
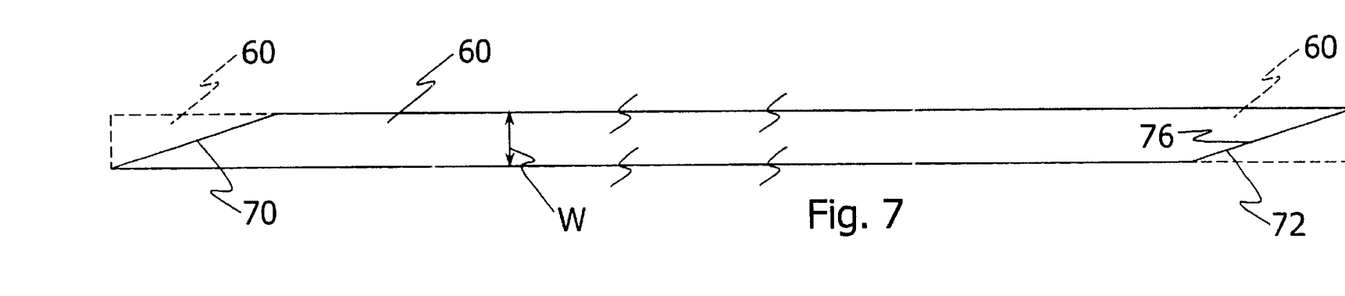
FIG. 7 is a strip from a role showing cutlines used to form loop section strips and composite strips.

Because the taper length T and the cut length C approaches zero as the width of the tape becomes small and the circumference of the pulley become large, a more streamline procedure may be used for cutting the pulley strips. This procedure includes measuring the circumference of the pulley using a measuring tape or measuring the diameter of the pulley and converting it into the circumference using the formula circumference equal 3.14 time diameter of pulley (C=ΠD). The lagging material strip 50 for example is unrolled from a roll, disposed with the adhesive side facing up. A small portion of lagging is cut using a sharp knife such that it is square with a length direction. A length equivalent to the circumference is then measured from the edge of the lagging composite element 50 using a measuring tape. After this measurement is made, a line is marked perpendicular to the edge. This presents a taper length T which is equal to the measured circumference. Based on the line marked on the composite lagging strip 50 a diagonal line is then drawn from the end of the strip to the line. Using a sharp knife and a straight edge ruler, a cut is made along the diagonal line so that the lagging tip is provided as in FIG. 7. The composite lagging element 50 is then brought to the pulley with the hook fastener side facing down (or in the case of the loop fastener element being applied directly to the pulley, with the adhesive side facing down) such that the diagonal side matches the edge of the pulley (the diagonal side edge abuts the pulley edge). The composite element is then spiral wrapped around until the entire face width of the pulley is covered.

Alternative procedures for applying the initial loop fastener element 30 directly to the pulley with adhesive or applying the pulley lagging composite element 50 to the loop structure the cut lines 70, 72 may be formed by simply using measuring tape to measure the pulley (or calculating the circumference based on the diameter using the formula above) wherein the measuring tape is placed at the end and extended the circumference distance C so as to extend this distance C from one edge of the element 30, 50 to the other whereby a mark may be made and a diagonal line may be cut with still a further procedure according to the invention, based on the known width of the elements 30 and/or 50, the cut line C may be provided by first consulting a trigametric formula or a table providing the relationship between the width W of the tape and the taper length T for given pulley diameter whereby the taper length T is measured, a line is marked based on the measured taper length and the diagonal cut line C is marked or cut based on the preliminary step of measuring the taper length and marking the taper length T.

Figure 6:
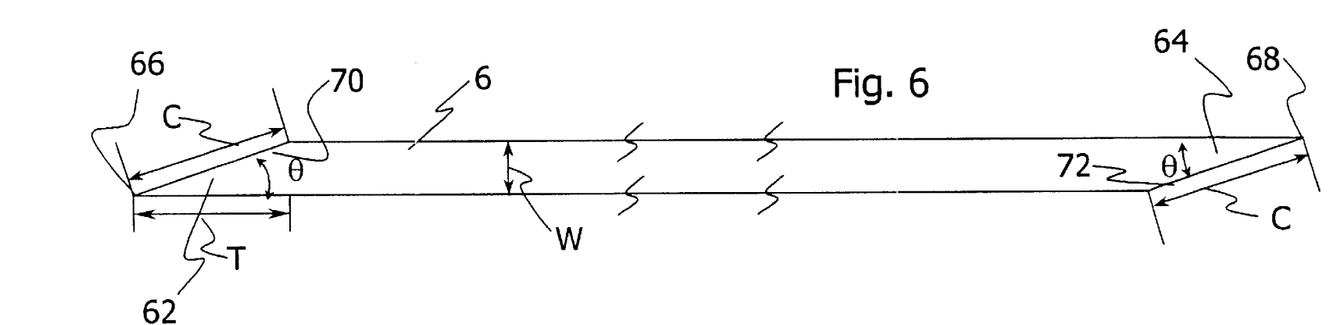
FIG. 6 is an explanation view of the strip with tapered ends.
Figure 8A:
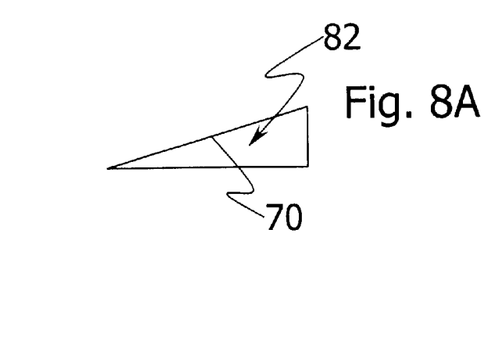
FIG. 8A is top view of a taper end template.
Figure 8B:
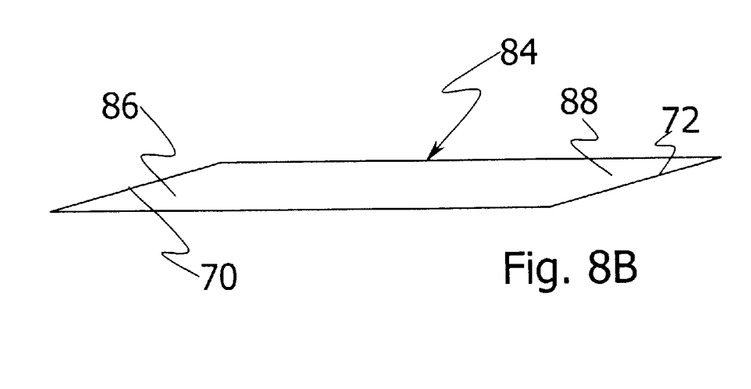
FIG. 8B it is a top view of a template with two taper ends.

In order to facilitate the formation of the two tapered end strip 60 a template 82 may be provided which has a cut line 70 with a taper length T and angle θ for a pulley having a particular circumference as in the cut strip of FIG. 6. Based on pulleys of known circumference, templates 82 may be made up for the corresponding circumference allowing an easy cutting of the tapered ends for the two tapered end strips 60. A single roll of each type of strip 30 and 50 may be provided and the tapered ends may be cut for various different pulleys. FIG. 8B shows an alternative design of a template 84 wherein two different template tip ends forming portions 86 and 88 are provided. The template 84 allows the measurement of the entire two tapered end strip to be measured and facilitates the cutting of the cutlines 70 to form the final strip 60.

As an alternative to using a template to cut two tapered end strips 60, two tapered end strips 60 may be formed by perforating or scoring or premarking the cut lines 70, 72 on the roll of loop strip material 30 or composite material 50. With such perforation, mark or scoring 76 the two tapered end strips 60 may be separated from the remainder of the material on a roll and easily used. However, the perforation, marking or score line 72 is only useful for a particular pulley 10 having a particular circumference and a particular length. The use of the templates allows multiple templates 82, 84 to be provided which can form two tapered end strips 60 for various different size pulleys.

Figure 9:
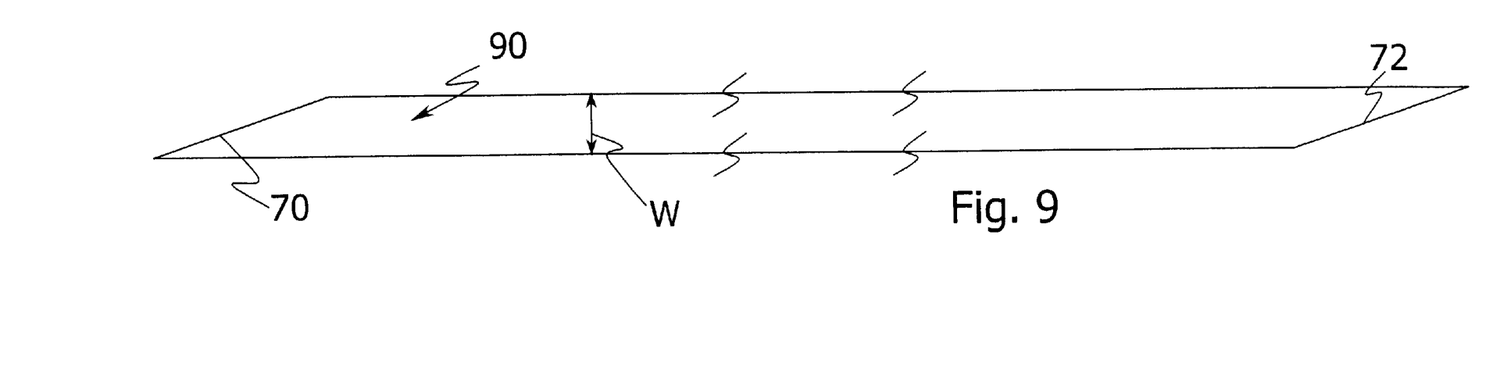
FIG. 9 is a top view of a precut loop section strip or composite strip.

FIG. 9 shows still another embodiment of the invention wherein precut two tapered end strips 90 are provided for use in attaching pulley lagging. The precut form has the cut lines 70, 72 positioned for a particular pulley. This is particular useful for replacement pulley lagging strips 90 formed of composite strip 50. The replacement strips are used after the loop material strip 30 has been applied to the pulley 10. However, both the loop strip material 30 as well as the composite strip material 50 may be provided in a precut form, ready for use.

It is particularly useful according to the invention to first use a template or measuring system to cut lengths of loop material 30 and fix these two the pulley 10 and subsequently use precut composite strip 50 to provide tapered end strips 90 for attaching lagging, and replacing worn lagging or switching lagging for different applications.

According to the system and process of the invention, a pulley 100 shown in FIGS. 10A and 10B is formed based on a strip of loop material 30, with two tapered ends 62 of a two tapered end strip 60. The cut line length is substantially equal to the circumference C of the roller 10. The material 30 is bonded to the pulley 10 by applying appropriate bonding cement such as BI cement to the backside of the material 30 and wrapping the material 30 around the pulley 10 in a spiral fashion. The cut line edge 70 is provided at one edge of the pulley 10 (e.g. the top edge) and upon wrapping material 30 around the pulley 10, preferably with side edges of the strip material 30 abutting (e.g., abutting, substantially abutting or nearly abutting) the opposite cut line edge 72 comes to lie along the opposite edge of pulley 10 (e.g. the lower edge). With use of the appropriate cement such as BI cement, the material 30 is fixed to the pulley 10. This provides a strong and substantially permanent bond to form the pulley structure 100. The vanishing point tip 66 and 68 may be further affixed with set screws 104 and 106 (or other fasteners such as tacks etc.)respectively. This ensures that the tapered portion 64 and 62 are maintained in position (there is no unraveling).

Figure 11A:
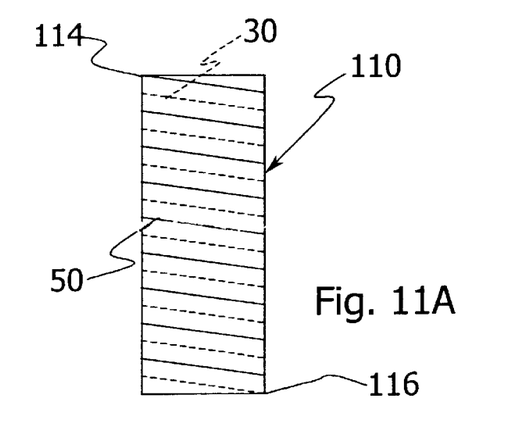
FIG. 11A is a top view of the pulley of FIG. 10A shown with the composite strip connected to the loop section strip (shown in dashed line)

The process of the invention further includes using the composite strip 50 cut into a tapered strip 60 by connecting the hook section 40 to the loop section 30. As can be seen in FIGS. 11A, this is done by winding the composite material around the pulley construction with the center of the strip 50 being provided substantially over the abutting line of the two adjacent strip portions of strip material 30. By this offset or staggering of the two wound strips, the structural integrity of the connection between the loop and faster material is enhanced. Set screws 114 and 116 (or other fasteners such as tacks etc.) may be used to further affix the vanishing point tip to the pulley construction 100, in order to form the pulley lagging construction 110 shown in FIGS. 11A and 11B.

The process and system of the invention preferably further include providing a roll or amount of strip material 30, providing a roll or amount of composite strip material 50 and providing information as to the position of the cut line 70 and 72 for various different pulleys 10 of various different circumference/length dimensions. Besides having the strip material, such as in roll form, and the basic information as to the position of the cut line 70 and 72 the kit may advantageously include one or more templates such as templates 82 and 84. Either type of template may be provided in the kit. Preferably various templates for different circumference/length pulley dimensions are provided in the kit, allowing various different types of pulleys to be used (a template of variable angle and taper length may also be used).

Additional replacement lagging kits may be provided with a roll of composite strip material 50. These may be provided with various different types of lagging material 22. As an alternative, the basic kit may be provided with one or more rolls of strip material 30 and strip material 50 wherein the cut line 70 and 72 are indicated either with a perforation, a score line or a marking, to indicate the proper position of the cut line 70 and 72 for any particular pulley. Even though the score lines, perforation lines or markings are particular for a particular pulley, combinations of cut line 70 and 72 may be provided along the length of the strip material 30 or 50 on a roll of strip material, thereby providing versatility, allowing various different pulleys to be serviced and used. Of course the rolls may be provided for a particular pulley size whereby a amount of strip material 30 or 50 is fed out and the two end tapered strip sections 60 are easily cut off from the remainder of the strip material.

The process and system of the invention provide for still another kit including precut two tapered end strips 60 which are ready to be used according to the invention. The basic kit may include precut two tapered ends strip sections 60 for each of the loop material 30 and the composite material 50. Advantageously, replacement kits may be provided with precut strips having one lagging surface or combinations of lagging surfaces, for particular applications.

Figure 11B:
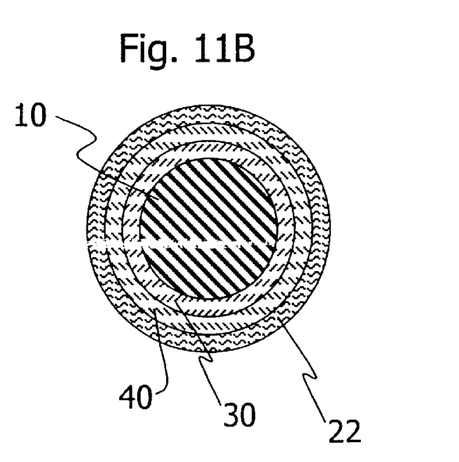
FIG. 11B is a cross sectional view of the pulley and pulley lagging of FIG. 11A.

The pulley assembly 110 shown in FIGS. 11A and 11B can be used with various different kinds of belts and the lagging strip 50 may be changed to work with any type of belt as desired. According to a further aspect of the system and process of the invention a belt 120 is used with the roller construction 110 (other pulley and lagging arrangements may also be used). The belt 120 has an outer loop section surface 122. Packages 134 or other articles which are being transported are provided with a hook section 132 affixed to the package 134. This provides a package assembly 130, which may be positioned with the section 132 facing down and in contact with the section 122 of belt 120, thereby facilitating the positioning of the package assembly 130 on the belt.

Figures 12, 13:
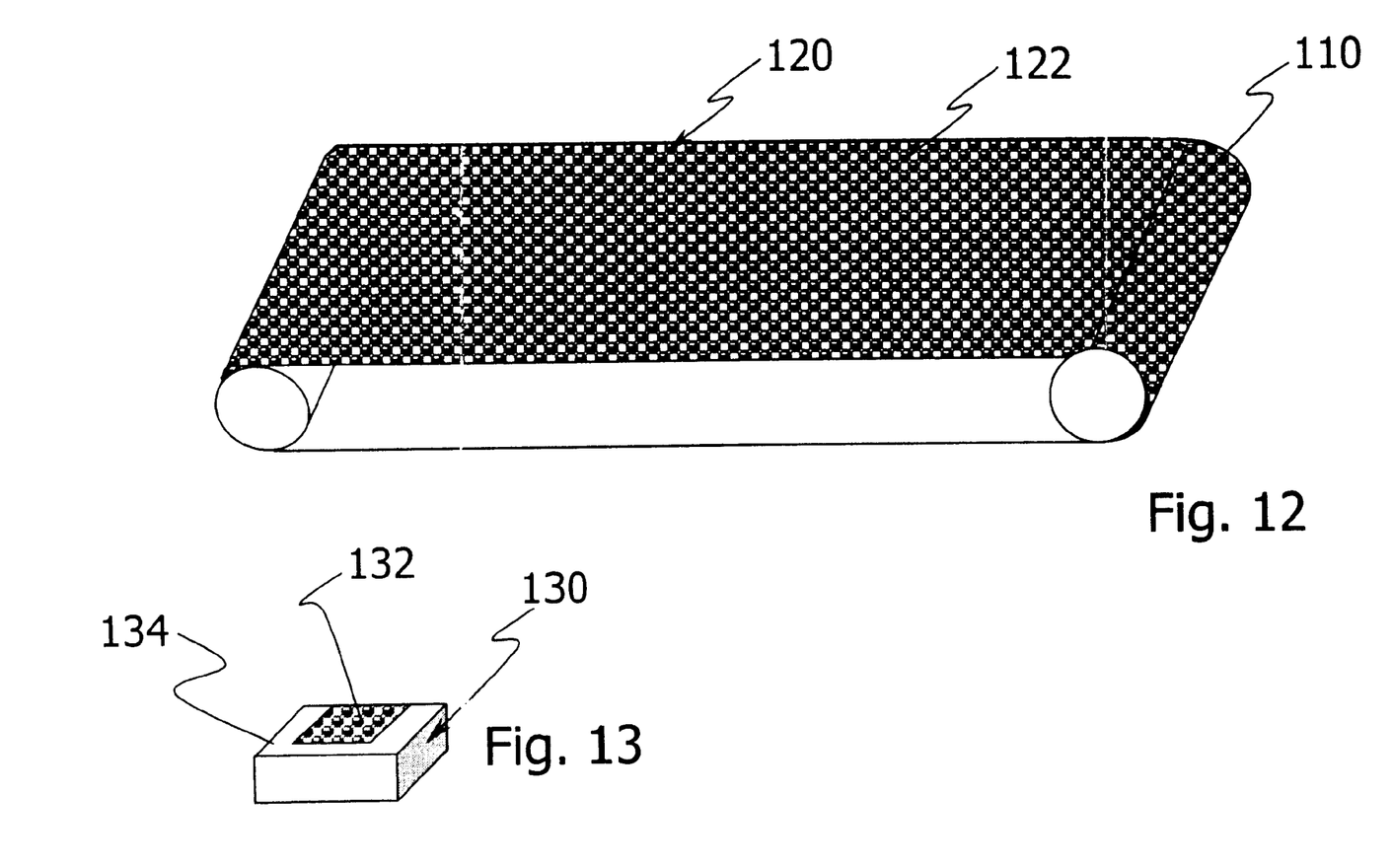
FIG. 12 is a perspective view of a belt system using the pulley and connected strips of FIG. 11, with a belt having a loop section surface.
FIG. 13 is a perspective view showing a packaging assembly including a package and a hook section strip applied on the surface thereof.
Figure 14A:
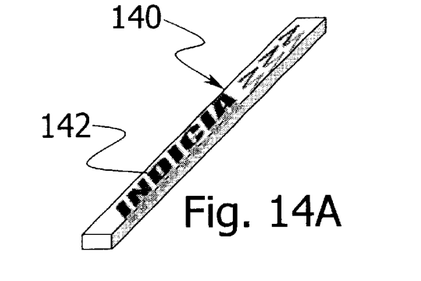
FIG. 14A is a perspective view showing a cleat/indicia strip with a hook section strip applied, showing the indicia side.
Figure 14B:
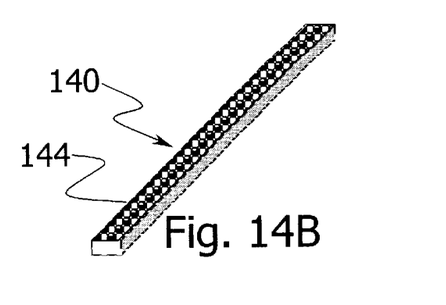
FIG. 14B is a perspective view showing a cleat/indicia strip with a hook section strip applied, showing the hook section strip side.

The belt structure of FIG. 12 may be provided to facilitate the use of cleats or other similar positioning or marking elements which are to wide on the pulley. FIG. 14A shows a perspective view of a cleat/indicia element generally designated 140. This element has some height to provide a cleat function. That is, often cleats are used on pulleys to separate items or position items or hold items on the belt. The cleat/indicia element 140 may have a height to facilitate the positioning. Additionally, the cleat/indicia element 140 may be provided only to the provide a marking on the belt (wherein the height may not be important). In FIG. 14A a side of the cleat/indicia element is shown with indicia 142. This may be useful to provide information as to the positioning of items or the sequence of items etcetera. As shown in FIG. 14B, the opposite side of cleat/indicia element 140 has an outer loop section surface 144. With this structure the cleat/indicia element 140 may be positioned appropriately on the belt 120.

Figure 15A:
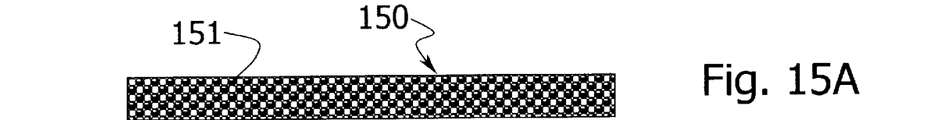
FIG. 15A is a bottom view showing a cleat element with a hook section strip on the belt engaging side.
Figure 15B:
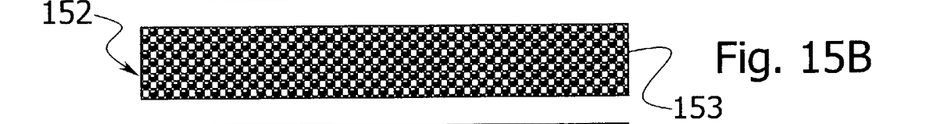
FIG. 15B is a bottom view showing a beefy cleat element with a hook section strip on the belt engaging side.
Figure 16A:
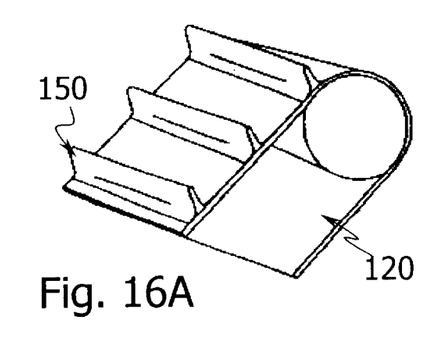
FIG. 16A is a perspective view showing a cleat and belt arrangement using cleat elements of FIG. 15A and the belt of FIG. 12.
Figure 16B:
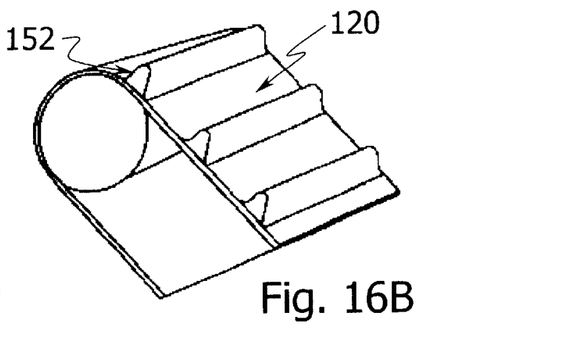
FIG. 16B is a perspective view showing a cleat and belt arrangement using beefy cleat elements of FIG. 15B and the belt of FIG. 12.

The belt structure 120 may also be used with other cleat elements which provide typical cleat functions. Again, indicia may be provided on the surface of the cleat, however this may not be necessary. FIG. 15A shows the bottom of a standard cleat type element 150 wherein the base 151 is provided with an outer loop section surface 151. With this structure, the cleat 150 may be disposed on the belt 120 and several cleat elements 150 may be provided in combination as shown in FIG. 16A. FIG. 15B shows a beefy cleat element 152, namely a cleat element which has additional width relative to its height. The cleat element 152 again has a base with an outer loop section surface 153. Cleat element 152 is positioned on the belt 120 either alone or in combination with other cleat elements, as shown in FIG. 16B.

Figure 15C:
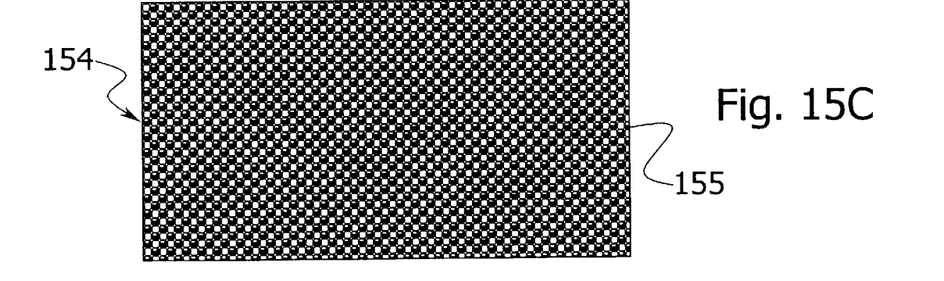
FIG. 15C is a bottom view showing a corrugated sidewall element with a hook section strip on the belt engaging side.
Figure 15D:
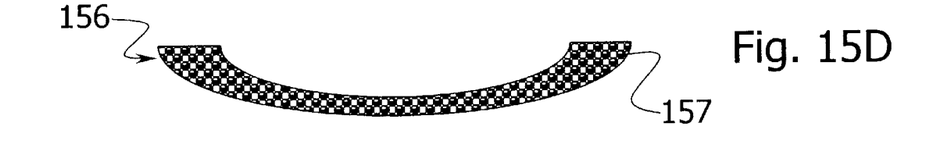
FIG. 15D is a bottom view showing a curved PVC cleat element with a hook section strip on the belt engaging side.
Figure 15E:
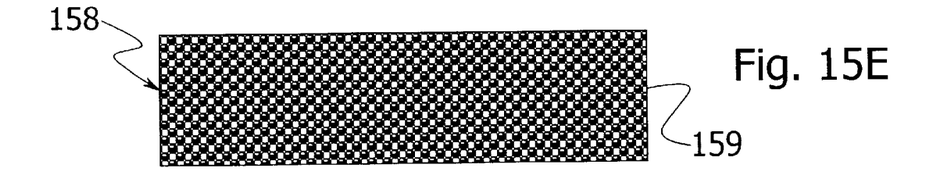
FIG. 15E is a bottom view showing a scoop cleat element with a hook section strip on the belt engaging side.
Figure 16C:
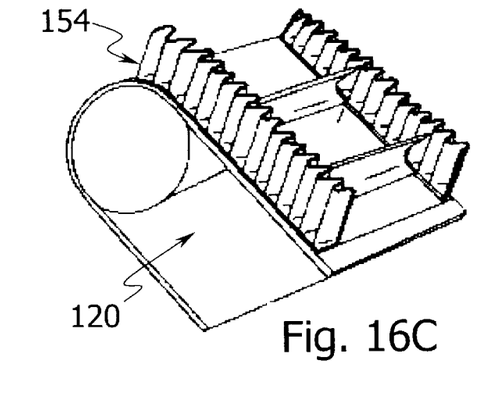
FIG. 16C is a perspective view showing a cleat and belt arrangement using corrugated sidewall elements of FIG. 15C and the belt of FIG. 12.
Figure 16D:
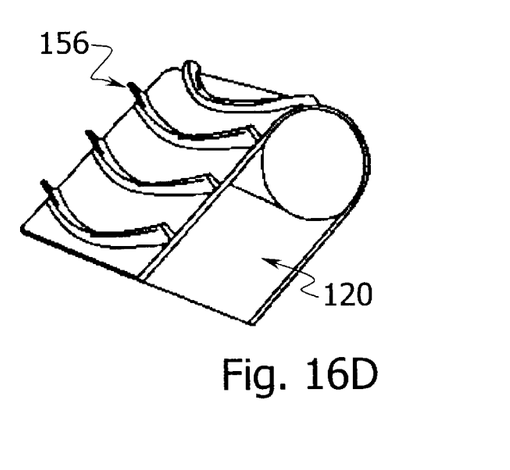
FIG. 16D is a perspective view showing a cleat and belt arrangement using curved PVC elements of FIG. 15D and the belt of FIG. 12.
Figure 16E:
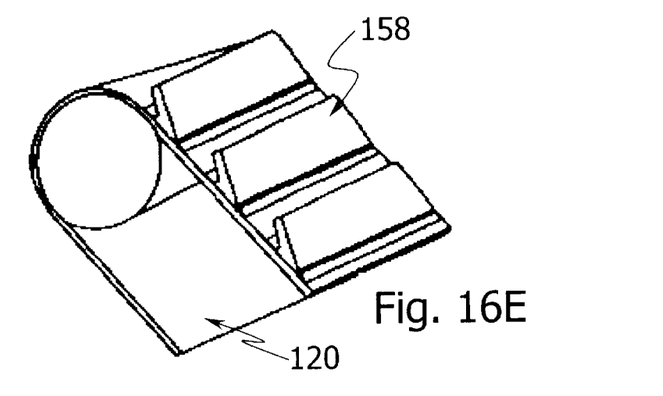
FIG. 16E is a perspective view showing a cleat and belt arrangement using scoop cleat elements of FIG. 15E and the belt of FIG. 12.

Other cleat structure or even side wall structures may be provided, including combinations of these. FIG. 15C shows a side wall element 154 that has a base with a surface 155 for contacting the belt 120. The base surface 155 has an outer loop section surface for engaging the side wall structure 154 with the belt 120 as shown in FIG. 16C. FIG. 15D shows a curved PVC cleat element 156 which has a base surface 157 in the form of an outer loop section surface. Cleat 156 may be applied to the belt 120 either alone or in combination with other cleats as shown in FIG. 16D. In a similar manner a scoop cleat element 158 is provided with a base outer loop section surface 159. This surface 159 is placed on the surface of belt 120 and the scoop cleat 158 may be provided alone or in combination with other cleats as shown in FIG. 16E.

Although the preferred embodiments of the invention include particular loop or hook sections disposed in particular sides of various assemblies, the invention allows for the possibility of the disclosed hook section being a loop section and the disclosed loop section being a hook section.

While specific embodiments of the invention have been shown and described in detail to illustrate the application of the principles of the invention, it will be understood that the invention may be embodied otherwise without departing from such principles.

What is claimed is:

1. A pulley and belt comprising:

a pulley element;

a belt engaging a belt engaging surface of said pulley, said belt having an outer belt hook and loop fastener surface;

a cleat with a hook and loop fastener surface for attachment to outer belt hook and loop fastener surface, said cleat hook and loop fastener surface positioning said cleat on said outer belt hook and loop fastener surface, said cleat including a wall extending away from said cleat hook and loop fastener surface, said wall engaging one or more articles on said belt for movement of the one or more articles upon movement of said wall with movement of said belt.

2. A pulley and belt comprising:

a pulley element;

a belt engaging a belt engaging surface of said pulley, said belt having an outer belt hook and loop fastener surface;

an article with hook and loop fastener surface for attachment, said article hook and loop fastener surface positioning the article on said belt via a hook and loop fastener connection;

a hook fastener strip with a back side and a fastener side;

a loop fastener strip with a back side and a fastener side;

a lagging strip with a back side and a belt engaging surface side;

a bond between one of the hook fastener strip and the loop fastener strip back side and the lagging strip back side to form a composite strip;

cutline edges at each of the composite strip and the other of the hook fastener strip and the loop fastener strip to form tapered ends at each strip end, each tapered end cutline edge defining an angle with a strip side edge of the strip leading to a vanishing point tip; and a bond between said other of the hook fastener strip and the loop fastener strip and an outer surface of said pulley element with said other of the hook fastener strip and the loop fastener strip spiral wrapped with a first cutline edge having a length substantially equal to a circumference of said pulley element and positioned substantially at an edge of said pulley element and with a second cutline edge having the length substantially equal to the circumference and positioned substantially at another edge of said pulley element.

3. A pulley with pulley lagging, comprising:

a pulley element having an outer surface with a length and a circumference;

a hook and loop fastener strip having one of a loop or a hook surface section and a back surface, said hook and loop fastener strip back surface being bonded to said pulley element outer surface, wherein said hook and loop fastener strip has a first tapered end with a first cutline edge and a second tapered end with a second cutline edge, said hook and loop fastener strip being bonded to said pulley element outer surface with said strip spiral wrapped with said first cutline edge having the length substantially equal to the circumference ad positioned substantially at an edge of said pulley element and with said second cutline edge having the length substantially equal to the circumference positioned substantially at another edge of said pulley element.

4. A pulley with pulley lagging according to claim 3, further comprising:

a composite strip including another hook and loop fastener strip having the other of a loop or a hook surface section and a back surface and a lagging strip with a belt engagement surface and a back surface, said another hook and loop fastener strip back being bonded to said lagging strip back, said composite strip other of a loop or a hook surface being connected to said loop or a hook surface section strip bonded to said pulley to provide a pulley and lagging assembly with said belt engagement surface facing outwardly.

5. A pulley with pulley lagging according to claim 3 wherein said composite strip has a width substantially equal to a width of said loop or a hook surface section strip and is connected to said loop or a hook surface section strip offset so as to overlie the interface between wrapped strip portions.

6. A pulley with pulley lagging according to claim 5, further comprising:

set screws or other fasteners, each tapered end of said composite strip tapering to a vanishing point tip, said set screws fixing said composite strip to the pulley at the vanishing point tip at each pulley edge.

7. A pulley and pulley lagging system, the system comprising:

a pulley element;

a hook fastener strip with a back side and a fastener side;

a loop fastener strip with a back side and a fastener side;

a lagging strip with a back side and a belt engaging surface side;

a bond between one of the hook fastener strip and the loop fastener strip back side and the lagging strip back side to form a composite strip;

cutline edges at each of the composite strip and the other of the hook fastener strip and the loop fastener strip to form tapered ends at each strip end, each tapered end cutline edge defining an angle with a strip side edge of the strip leading to a vanishing point tip;

a bond between said other of the hook fastener strip and the loop fastener strip and an outer surface of said pulley element with said other of the hook fastener strip and the loop fastener strip spiral wrapped with a first cutline edge having a length substantially equal to a circumference of said pulley element and positioned substantially at an edge of said pulley element and with a second cutline edge having the length substantially equal to the circumference and positioned substantially at another edge of said pulley element.

8. A pulley and pulley lagging system according to claim 7, further comprising:

a hook and loop fastener connection between said composite strip and said other of a loop or a hook surface strip bonded to said pulley element to provide a pulley and lagging assembly with said belt engagement surface facing outwardly.

9. A pulley and pulley lagging system according to claim 7, wherein said one of the hook fastener strip and the loop fastener is bonded to said lagging strip prior to cutting the tapered ends.

10. A pulley and pulley lagging system according to claim 7, wherein the cutline edge is cut for each of said composite strip and said other of a loop or a hook surface strip based on selecting the location of each cutline based on the circumference of the pulley element and based on the length of the pulley element wherein each cutline edge has a length substantially equal to the circumference of the pulley element with an angle of each cutline edge relative to the strip side edge being based on the strip width and the circumference of the pulley and the distance between the taper ends of each strip is selected based on the pulley element length.

11. A pulley and pulley lagging system according to claim 7, wherein said composite strip has substantially the identical shape to the shape of the section strip bonded to the pulley and said composite strip is fastened via said hook and loop fastener connection with said composite strip covering the adjoining edges of the loop section strip, providing a staggering and resulting structural benefits.

12. A pulley and pulley lagging system according to claim 7, further comprising:

set screws or other fasteners, each tapered end of said composite strip tapering to a vanishing point tip, said set screws fixing said composite strip to the pulley at the vanishing point tip at each pulley edge.

13. A pulley and pulley lagging system according to claim 7, further comprising:

a belt engaging said belt engaging surface, said belt having a belt hook and loop fastener surface;

an article hook and loop fastener surface for attachment, said article hook and loop fastener surface positioning the article on said belt via a hook and loop fastener connection.

14. A process for providing a pulley with pulley lagging, the process comprising the steps of:

providing a pulley element, the pulley element having an outer surface with a circumference and a length;

providing a hook fastener strip with a back side and a fastener side;

providing a loop fastener strip with a back side and a fastener side;

providing a lagging strip with a back side and a belt engaging surface side;

bonding one of said hook fastener strip and said loop fastener strip back side to said lagging strip back side to form a composite strip;

cutting the composite strip and the other of said hook fastener strip and said loop fastener strip to provide tapered ends at each strip end, each tapered end having a cutline edge defining an angle with a strip side edge of the strip leading to a vanishing point tip, a position of each said cutline edge being selected based on the circumference and the length;

bonding said other of said hook fastener strip and said loop fastener strip with said outer surface of said pulley element and with said other of said hook fastener strip and said loop fastener strip spiral wrapped with a first cutline edge having a length substantially equal to a circumference of said pulley element and positioned substantially at an edge of said pulley element and with a second cutline edge having the length substantially equal to the circumference and positioned substantially at another edge of said pulley element.

15. A process for providing a pulley with pulley lagging according to claim 14, further comprising the steps of:

forming a hook and loop fastener connection between said composite strip and said other of said loop or said hook surface strip to provide a pulley and lagging assembly with said belt engagement surface facing outwardly.

16. A process for providing a pulley with pulley lagging according to claim 15, further comprising the steps of:

providing said hook fastener strip, said loop fastener strip and said lagging strip in a kit with information for the e position of the cutlines based on pulley outer surface with a circumference and a length.

17. A process for providing a pulley with pulley lagging according to claim 16, wherein said information includes at least one template for cutting the cutlines based on a pulley outer surface with the circumference and the length.

18. A process for providing a pulley with pulley lagging according to claim 16, wherein the kit includes precut strips providing the position of the cutlines.

19. A process for providing a pulley with pulley lagging according to claim 16, wherein the information includes a cutline mark, a cutline perforation or a cutline score.

20. A process for providing a pulley with pulley lagging according to claim 16, wherein the composite strip and said other of said loop or said hook surface strip are provided as a roll and said information is one of at least one template for cutting the cutlines based on a pulley outer surface with the circumference and the length and one or more cutline mark, cutline perforation line or a cutline score for forming strips corresponding to one or more outer surface with the circumference and the length.

* * * * *